United States Patent

Perry et al.

[11] Patent Number: 5,927,948
[45] Date of Patent: Jul. 27, 1999

[54] PROPELLER

[75] Inventors: Frederick John Perry, Yeovil; Alan Brocklehurst, Dorset; Robert John Harrison, South Petherton, all of United Kingdom

[73] Assignee: GKn Westland Helicopters Limited, Yeovil, United Kingdom

[21] Appl. No.: 08/839,177

[22] Filed: Apr. 23, 1997

[30] Foreign Application Priority Data

Apr. 30, 1996 [GB] United Kingdom ................... 9608838

[51] Int. Cl.[6] .............................. B64C 11/16; B64C 11/18
[52] U.S. Cl. ........................................ 416/228; 244/17.11
[58] Field of Search ............................... 244/17.11, 35 R, 244/49, 91; 416/228

[56] References Cited

U.S. PATENT DOCUMENTS

| | | | |
|---|---|---|---|
| 2,014,242 | 9/1935 | Weichwald | 244/17.11 |
| 2,802,630 | 8/1957 | Birchill et al. | 244/91 |
| 3,066,742 | 12/1962 | Castles, Jr. | 416/228 |
| 3,467,197 | 9/1969 | Spivey et al. | 416/228 |
| 4,012,172 | 3/1977 | Schwaar et al. | 416/228 |
| 4,077,741 | 3/1978 | Lowson et al. | 416/228 |
| 4,427,344 | 1/1984 | Perry | 416/228 |
| 4,975,022 | 12/1990 | Perry | 244/17.11 |
| 5,199,851 | 4/1993 | Perry et al. | 416/228 |
| 5,205,715 | 4/1993 | Perry et al. | 416/228 |
| 5,246,344 | 9/1993 | Perry | 416/228 |
| 5,337,974 | 8/1994 | Rumberger et al. | 244/49 |

*Primary Examiner*—Charles T. Jordan
*Assistant Examiner*—Charles R. Ducker, Jr.
*Attorney, Agent, or Firm*—Larson & Taylor

[57] ABSTRACT

A propeller (10a) comprising a plurality of propeller blades (9a) each having a root end (11a) attached to the central propeller disc or hub (12a), an intermediate portion (13a) extending from the root end (11a) and having a generally aerofoil cross section extending chordwise between a leading edge (14a) and a trailing edge (15a), and the blade (9a) having a tip (19) at an end of the intermediate portion (13a) remote from the root end (11a), the tip (19) having a leading edge portion (20) extending forwardly from a junction (21) with the leading edge (14a) of the intermediate portion (13a) thus to provide a discontinuity or notch (25) in the leading edge (14a) of the blade (9a) at the junction (21).

14 Claims, 2 Drawing Sheets

PROPELLER

BACKGROUND TO THE INVENTION

This invention relates to a propeller and particularly but not exclusively to a propeller for a prop/rotor of a vertical take-off and landing aircraft (VTOL) such as a tilt wing or tilt rotor aircraft. However, the invention may be applied to a propeller of a conventional fixed wing aircraft.

DESCRIPTION OF THE PRIOR ART

Tilt rotor and tilt wing VTOL aircraft place great demands on the prop/rotor design. In particular, the prop/rotor(s) must be able to provide sufficient static thrust to enable the aircraft to hover and climb and also must provide adequate thrust when acting as a propeller to propel the aircraft at speeds up to, say, 350 knots at economic cruising altitudes where the prop/rotor(s) is/are in largely axial flow.

To provide the thrust required to hover from a prop/rotor of limited diameter, high tip speeds are necessary if blades of the prop/rotor are not to have excessive chord width, which would lead to higher than desirable weight and a mis-match with the blade area required in the airplane mode. To obtain a match in thrust capability when the prop/rotor is acting as a rotor to enable the aircraft to hover and climb and when the prop/rotor is acting as a propeller when the aircraft is cruising, the tip speed may be reduced when the aircraft is cruising, but even so the blade tip Mach number will remain high.

Shocks may thus form at the blade tips normal to the blade surface, and may propagate radially outwardly from the tip of the propeller blade and wash over the fuselage of the aircraft, particularly at least when the aircraft is cruising. This can give rise to significant passenger discomfort due to noise being transmitted into the passenger cabin of the aircraft. Also, on tilt rotor aircraft, when the prop/rotor changes orientation between the position required to achieve hover and the position required for cruising, i.e. during transitional flight, blade vortex interaction noise from the prop/rotor blades can become a problem which means that flying restrictions need to be placed on the operation of such aircraft. during descending flight.

It is known, for example, in our previous patent GB-1538055 that the performance of a retreating rotor blade of a main sustaining rotor of a helicopter at high angle attack can be enhanced by providing the blades of the main sustaining rotor, with a rearwardly swept extreme tip edge.

The same patent also teaches that the development of shocks at high speed on the advancing rotor blade of the helicopter rotor can be inhibited by a swept tip configuration.

SUMMARY OF THE INVENTION

According to a first aspect of the invention we provide a propeller comprising a plurality of propeller blades each having a root end attached to the central propeller disc or hub, an intermediate portion extending from the root end, the intermediate portion having a generally aerofoil cross section extending chordwise between a leading edge and a trailing edge, and the blade having a tip at an end of the intermediate portion remote from the root end, the tip having a leading edge portion extending forwardly from a junction with the leading edge of the intermediate portion thus to provide a discontinuity or notch in the leading edge of the blade at the junction.

Thus it has been found that the technology developed and described in GB-1538055 for a main sustaining rotor of a helicopter, can advantageously be applied to the design of a propeller.

The leading edge portion of the tip may extend forwardly from the junction with the leading edge of the intermediate portion to a point located forwardly of the leading edge of the intermediate portion. The tip may have a second leading edge portion which sweeps rearwardly from the first mentioned point to a second point. The tip may have a rearwardly swept tip edge of higher sweep magnitude than the second leading edge portion and which extends to a third point. Preferably a curved joining portion blends the second leading edge portion of the tip with the tip edge. The tip may further include a rearwardly swept trailing edge extending from a junction with a trailing edge of the intermediate portion to the third point. Thus the swept tip may have a larger chord dimension than a chord dimension between the leading and trailing edges of the intermediate portion.

Thus the provision of a forward extension at the tip to provide a discontinuity or notch, which on a main sustaining rotor of a helicopter was provided to maintain pitching moment balance when sweep back was applied to an outer region has been found to provide a favorable aerodynamic interference effect on a propeller blade, in that it relieves the shock strength on the tip adjacent to the notch. The chordwise offset in the forward edge of the blade, provided at the notch, leads to a misalignment of the pressure fields such that the tendency for a shock to form and propagate radially outwardly beyond the tip edge is greatly reduced in the propeller blade. As the angle of attack, or loading, increases, the super velocity or suction regions adjacent to the notch move forward such that misalignment is maintained. Thus any shocks generated are truncated at the notch. This favorable aerodynamic interference effect due to planform is in addition to the effects which can be obtained due to sweep or aerofoil section thickness to chord ratio.

In the propeller blade of the propeller of the invention, the increase in chord dimension outboard of the notch helps to maintain a uniform circulation distribution since the aerofoil section camber may be reduced outboard of the notch and also makes it convenient to reduce the thickness to chord ratio of the outboard aerofoil section. Hence the tendency for a shock to form, due to local super velocities which would otherwise be present on a two-dimensional aerofoil in this region, is further reduced. Therefore, the reduction in shock strength outboard of the notch is much greater than would be expected from the consideration of the two-dimensional characteristics of the aerofoils alone, due to the favorable three dimensional aerodynamic interference effects of the planform offset provided by the notch, as explained above.

By providing for the sweep progressively to increase along the tip of the propeller blade, continued suppression of compressibility effects is provided. Therefore the formation of shocks on the propeller blade when provided with a swept tip edge is delayed to much higher tip speeds. Additionally, the high degree of sweep at the extreme tip edge further prevents any weak shocks that might eventually form at the tip in the outer region of the blade from propagating beyond the tip edge.

The forwardly extending edge portion of the tip may comprise a radiused portion blended at the junction with the leading edge of the intermediate portion of the propeller blade. Similarly a radiused portion may blend the first and second leading edge portions of the tip.

Preferably the outer area of the tip progressively reduces in thickness towards the tip edge and the chamber of the aerofoil may be further reduced.

Such features are important on a main sustaining rotor of a helicopter to avoid high control loads which would otherwise limit the performance of the advancing blade, and they also provide significant acoustic benefit in noise suppression in the aircraft farfield.

For a tilt rotor or tilt wing VTOL type aircraft, or a conventional fixed wing aircraft with highly loaded, high tip speed propeller blades, near field noise is a problem. The passing of shocks emanating from the blade tips in the near field is precisely the reason for cabin noise accentuated when the propellers are close to the sides of the fuselage and shocks produced by the rotor blades wash over the fuselage surface.

Hence the present invention enables at least some of the features of an advanced helicopter rotor blade usefully to be employed in a propeller blade. In a VTOL aircraft with tilt rotor or tilt wing capability, when the prop/rotor equipped with such propeller blades is acting as a rotor, the known main advantages of providing these features on a rotor of a helicopter, can also be enjoyed.

If desired, at least an outward region of the tip may comprise anhedral. In a helicopter application the use of such anhedral on main sustaining rotor blades has been found to reduce the power required for hovering. This advantage would be equally applicable to a tilt rotor or a tilt wing aircraft when operating in hover mode. A propeller blade of a propeller in accordance with the invention which employs anhedral at an outward region of the tip would not be detrimental in axial flow high speed cruise situations and thus the power required to hover could be reduced on a tilt rotor or a tilt wing aircraft, with the potential to increase the static thrust available for a given power on a conventional propeller.

An important advantage of a swept tip edge on a conventional main sustaining rotor of a helicopter is the ability to suppress the tendency for stall flutter and when applied to a VTOL tilt rotor or a tilt wing aircraft, stall flutter, which may form a limit to the performance of some propellers, and prop/rotors in particular, due to the growth of fatigue loads and vibration in the static condition, can be suppressed.

A propeller blade of the propeller in accordance with the invention may also be provided with a flap-like device adjacent the trailing edge such as is used on highly loaded rotor blades of a main sustaining rotor of a helicopter, as disclosed in U.S. Pat. No. 5,492,448.

BRIEF DESCRIPTION OF THE DRAWINGS

The invention will now be described with reference to the accompanying drawings in which.

DESCRIPTION OF THE PREFERRED EMBODIMENTS

Figure 1:
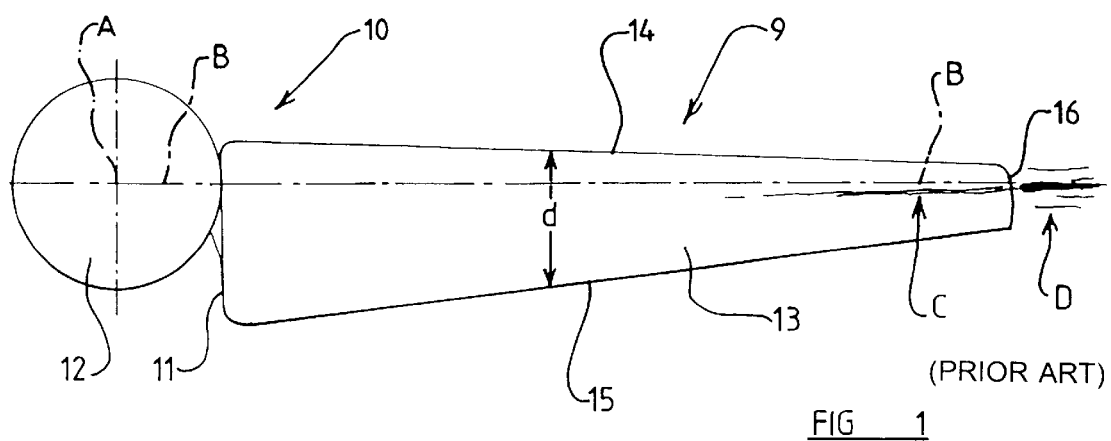
FIG. 1 is a fragmentary view of a conventional propeller.

Referring first to FIG. 1, there is shown a conventional propeller 10 showing one only of a plurality of blades each comprising a root end 11 which is attached to a propeller disc 12 or hub, by which the propeller 10 is rotated about a rotational axis A.

The blade 9 further comprises an intermediate portion 13 having an aerofoil cross section extending between a leading edge 14 and a trailing edge 15 with a chord dimension d therebetween. In this example, the chord dimension decreases from the root end 11 towards a blade tip edge 16 and the intermediate portion 13 is of a generally helical twisted configuration between the root 11 and the tip edge 16. The pitch angle of the blades 9 can be varied by rotation about axis B—B so as to provide a means of control of the thrust produced. When used as a conventional propeller on a fixed wing aircraft the pitch angle will be the same for all blades, but for a prop/rotor of a VTOL aircraft the pitch angle may be varied cyclically similar to a helicopter sustaining rotor to provide control during transitional manoeuvres.

In use, as the blade 9 rotates about an axis A, shocks form on the upper surface towards an outer end of the blade 9 as indicated at C, and propagate outwardly beyond the tip edge 16 into the near field as indicated by arrow D.

When the propeller 10 is in use as a prop/rotor in a VTOL tilt rotor or tilt wing aircraft, it will operate in a first orientation as a rotor with the axis A extending generally vertically to enable the aircraft to hover and climb and in a second orientation such that the axis A extends generally horizontally in the direction of movement of the aircraft, such that the propeller 10 is in axial air flow, to enable the aircraft to cruise. Of course, the propeller 10 will also operate between the first and second positions in a transition mode when the propeller 10 performs the role of sustaining flight at lower air speeds as well as giving some propulsion.

Particularly, but not exclusively, when the propeller 10 in the prop/rotor configuration is in an orientation when it provides propulsion for cruising, the shocks which propagate beyond the tip edge 16 can cause discomfort to passengers located in an aircraft cabin close to the tip edge 16 as such shocks wash over the fuselage of the aircraft. A similar problem is encountered when the propeller 10 is used as a conventional propeller on a fixed wing aircraft.

Figure 2:
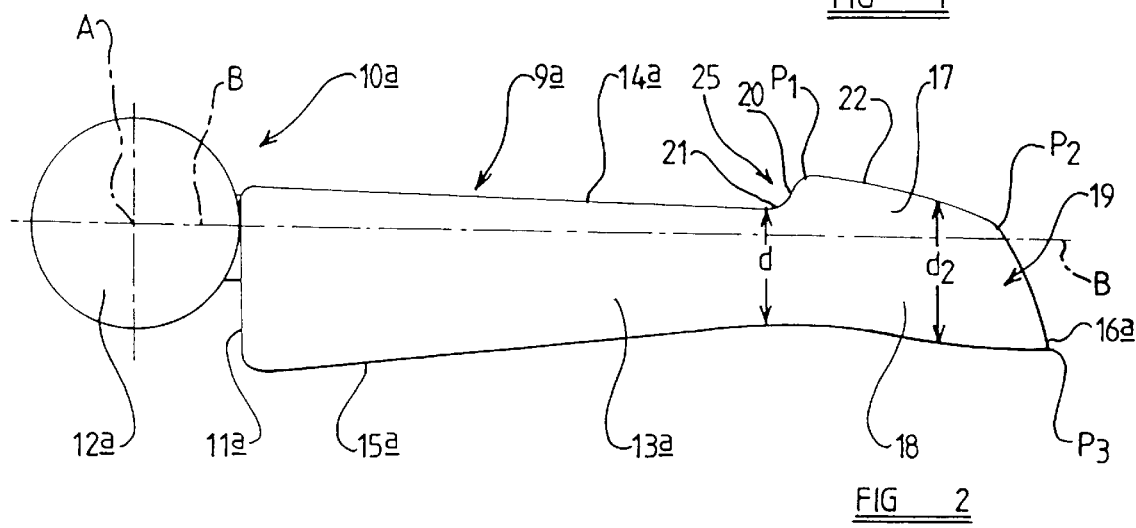
FIG. 2 is a view similar to that of FIG. 1, but of a propeller in accordance with the invention.

Referring now to FIG. 2 there is shown a blade 9a of a propeller 10a similar to that shown at 10 in FIG. 1, but in accordance with the invention. Similar parts are labelled by the same reference sign with an "a" added.

In this embodiment the blade tip 19 includes a forward region 17 and a rear region 18.

The tip 19 has a first leading edge portion 20 which extends forwardly from a junction 21 with the leading edge 14a of the intermediate portion 13a of the blade 10a, to a first point P1 located forwardly of the leading edge 14a of the intermediate portion 13a, a second leading edge portion 22 which is swept rearwardly from the first point P1 to a second point P2, the tip edge 16a being rearwardly swept from the second point P2 to a third point P3, with the second point P2 being included within a blended curved joining portion between the second leading edge portion 22 and a highly swept extreme tip edge 16a which in a preferred embodiment incorporates anhedral or blade droop.

Thus the tip 19 has a larger chord dimension d2 than the chord dimension d1 of the intermediate portion 13a immediately inboard of the tip. The outer area of the tip 19 may progressively be reduced in thickness towards the tip edge at 16a.

Thus in the blade 9a of a propeller 10 in accordance with the invention, there is a notch 25 where the intermediate portion 13a of the blade 10a meets the blade tip 19.

Figure 3:
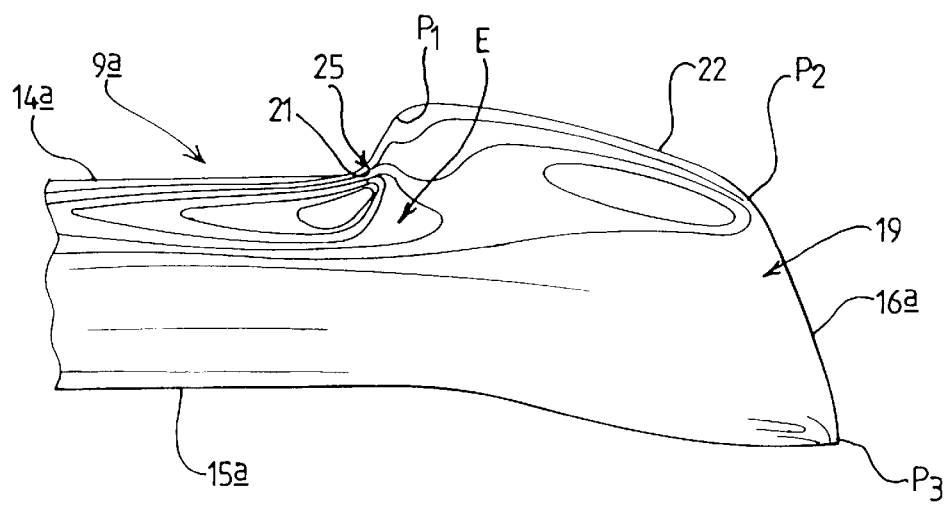
FIG. 3 is a more detailed view of the outer end of a blade of the propeller shown in FIG. 2, showing how shocks are truncated towards the tip of the blade.
Figure 4:
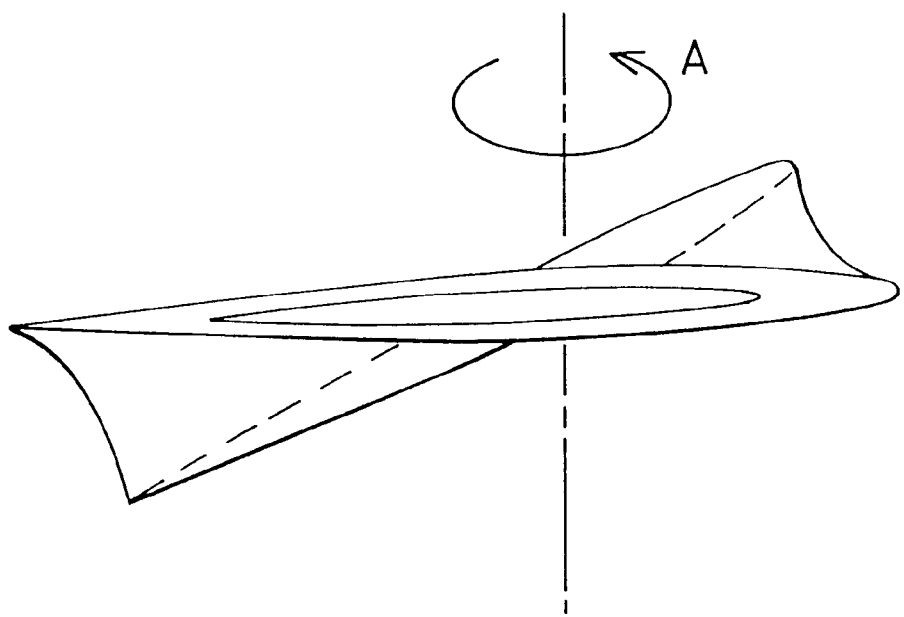
FIG. 4 is a view toward the tip end of FIG. 2 wherein the outer area of the tip of the blade progressively reduces in thickness towards the tip edge and the intermediate portion incorporates a generally helical twist.

Referring to FIG. 3 it can be seen that shocks (shown diagrammatically) generated along the blade 9a become truncated adjacent the notch 25 in the area indicated at E and hence do not propagate beyond the tip edge 16a due to favorable aerodynamic interference effects caused by virtue of the provision of the notch 25. Furthermore, because of the swept tip configuration of the tip edge 16a, there is no opportunity for shocks to re-form or be established at the tip 19. Thus, since the shocks on the surface of the tip 19 have been suppressed they no longer extend beyond the tip in a radial direction thereby eliminating or at least reducing the propagation of acoustic waves towards the aircraft cabin.

Various modifications may be made without departing from the scope of the invention.

For example whereas the invention has been described with particular reference to a prop/rotor blade 9a of a VTOL tilt wing or tilt rotor aircraft, the invention may be applied, particularly but not exclusively to highly loaded, propeller blades of conventional fixed wing aircraft.

The blade tip 19 need not be of the configuration shown in FIGS. 2 and 3, but may be significantly modified. For example, although in the example described, the rearwardly swept tip edge 16a is of a significantly higher sweep magnitude than the adjacent second leading edge portion 22 of the blade tip 19, they may be of closer or larger relative magnitude than shown. Also, as is preferred, the second point P2 between the second leading edge portion 22 and the rearwardly swept blade tip edge 16a is included within a curved joining portion so that the second leading edge portion 22 and swept tip edge 16a are blended together, the second point P2 may be more abrupt in another design.

Although the tip edge 19 is preferably swept rearwardly and outwardly as shown, this need not be an essential in some tip designs.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverseforms thereof.

We claim:

1. A propeller for an aircraft, the propeller, during at least part of its operation, being rotated about a generally horizontal axis in axial flow conditions to provide forward thrust for the aircraft, the propeller comprising a plurality of propeller blades each having a root end attached to a central propeller disc or hub, an intermediate portion extending from the root end and having a generally aerofoil cross section extending chordwise between a leading edge and a trailing edge, and the blade having a tip at an end of the intermediate portion remote from the root end, the tip having a first leading edge portion extending forwardly from a junction with the leading edge of the of the intermediate portion thus to provide a discontinuity or notch in the leading edge of the blade at the junction and a second leading edge portion which sweeps rearwardly from the first mentioned point to a second point.

2. A propeller according to claim 1 wherein the leading edge portion of the tip of the blade extends forwardly from the junction with the leading edge of the intermediate portion to a point located forwardly of the leading edge of the intermediate portion.

3. A propeller according to claim 2 wherein the tip of the blade has a rearwardly swept tip edge of higher sweep magnitude than the second leading edge portion and which extends to a third point.

4. A propeller according to claim 2, wherein a curved joining portion blends the second leading edge portion of the tip with the tip edge.

5. A propeller according to claim 3 wherein the tip of the blade includes a rearwardly swept trailing edge extending from a junction with a trailing edge of the intermediate portion to the third point.

6. A propeller according to claim 5 wherein the swept tip of the blade has a larger chord dimension than a chord dimension between the leading and trailing edges of the intermediate portion.

7. A propeller according to claim 1 wherein the forwardly extending edge portion of the tip of the blade comprises a radiused portion blended at the junction with the leading edge of the intermediate portion of the propeller blade.

8. A propeller according to claim 2 wherein a radiused portion blends the first and second leading edge portions of the tip of the blade.

9. A propeller according to claim 1 wherein the outer area of the tip of the blade progressively reduces in thickness towards the tip edge.

10. A propeller according to claim 1 wherein at least the intermediate portion of the propeller blade incorporates generally helical twist.

11. A propeller according to claim 1 wherein at least an outward region of the tip comprises anhedral.

12. An aircraft having a propeller according to claim 1.

13. A VTOL aircraft having a prop/rotor comprising a propeller in accordance claim 1.

14. A propeller comprising a plurality of propeller blades each having a root end attached to a central propeller disc or hub, an intermediate portion extending from the root end and having a generally aerofoil cross section extending chordwise between a leading edge and a trailing edge, and the blade having a tip at an end of the intermediate portion remote from the root end, the tip having a first leading edge portion extending forwardly from a junction with of the intermediate portion thus to provide a discontinuity or notch in the leading edge of the blade at the junction, the leading edge portion of the tip of the blade extending forwardly from the junction with the leading edge of the intermediate portion to a point located forwardly of the leading edge of the intermediate portion, the tip of the blade having a second leading edge portion which sweeps rearwardly from the first mentioned point to a second point, the tip of the blade having a rearwardly swept tip edge of higher sweep magnitude than the second leading edge portion and which extends to a third point, the tip of the blade including a rearwardly swept trailing edge extending from a junction with a trailing edge of the intermediate portion to the third point, the swept tip of the blade having a larger chord dimension than a chord dimension between the leading and trailing edges of the intermediate portion.

* * * * *